(12) United States Patent
Obstfeld et al.

(10) Patent No.: US 12,425,247 B2
(45) Date of Patent: Sep. 23, 2025

(54) SYSTEMS AND METHODS FOR OBSERVING SMART CONTRACTS

(71) Applicant: Cisco Technology, Inc., San Jose, CA (US)

(72) Inventors: Joel Abraham Obstfeld, Bushey (GB); Oliver James Bull, Portishead (GB); Louis Gwyn Samuel, Swindon (GB); Andrew Pletcher, Scotts Valley, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 251 days.

(21) Appl. No.: 18/360,274

(22) Filed: Jul. 27, 2023

(65) Prior Publication Data

US 2025/0039002 A1 Jan. 30, 2025

(51) Int. Cl.
*H04L 9/00* (2022.01)
(52) U.S. Cl.
CPC ..................... *H04L 9/50* (2022.05)
(58) Field of Classification Search
CPC ........................................................ H04L 9/50
See application file for complete search history.

(56) References Cited

U.S. PATENT DOCUMENTS

| | | | |
|---|---|---|---|
| 2016/0149769 A1 | 5/2016 | Joshi et al. | |
| 2018/0130050 A1 | 5/2018 | Taylor et al. | |
| 2019/0342084 A1 | 11/2019 | Mehedy et al. | |
| 2020/0026548 A1* | 1/2020 | Huang | G06F 16/2379 |
| 2020/0065763 A1 | 2/2020 | Rosinzonsky et al. | |
| 2020/0295936 A1 | 9/2020 | Covaci et al. | |
| 2020/0389537 A1* | 12/2020 | Mercuri | H04L 9/0643 |
| 2021/0049157 A1* | 2/2021 | Lu | G06F 16/27 |
| 2021/0073285 A1* | 3/2021 | Hunter | H04L 9/3263 |
| 2021/0073287 A1* | 3/2021 | Hunter | H04L 67/133 |
| 2021/0105608 A1* | 4/2021 | Mercuri | G06Q 20/223 |
| 2021/0117385 A1* | 4/2021 | Haldar | G06F 11/1448 |
| 2021/0194700 A1 | 6/2021 | Moy et al. | |
| 2021/0312088 A1 | 10/2021 | Choi | |

(Continued)

OTHER PUBLICATIONS

Browning E., "What Are Cross-Chain Connected Applications", Moonbeam, Jul. 20, 2022, pp. 1-12.

(Continued)

*Primary Examiner* — Oleg Survillo
(74) *Attorney, Agent, or Firm* — Edell, Shapiro & Finnan, LLC

(57) ABSTRACT

Presented herein are techniques for observing smart contracts. A method can include obtaining, by a digital twin, a first data set from a first smart contract that stores the first data to a first distributed ledger and a second data set from a second smart contract that stores the second data set to a second distributed ledger. Determining operating states of the first and second smart contracts based on the first data set, the second data set, and one or more state messages from an oracle associated with the first distributed ledger and the second distributed ledger. Generating a consolidated view of the first and second smart contracts, based on the operating states. And providing the consolidated view of the first and second smart contracts for monitoring the operating states and interactions between the first and second smart contracts as a whole.

20 Claims, 6 Drawing Sheets

(56) References Cited

U.S. PATENT DOCUMENTS

| | | | |
|---|---|---|---|
| 2022/0217113 A1 | 7/2022 | Khan et al. | |
| 2022/0327538 A1* | 10/2022 | Kumar | H04L 9/3263 |
| 2022/0374870 A1* | 11/2022 | Wilson | G06F 16/1834 |
| 2023/0085481 A1 | 3/2023 | Padmanabhan | |
| 2024/0073017 A1* | 2/2024 | Fruchter | H04L 9/0869 |
| 2024/0205011 A1* | 6/2024 | Robert | H04L 9/3221 |
| 2024/0333741 A1* | 10/2024 | Abdelrahman | G06Q 20/382 |
| 2024/0370866 A1* | 11/2024 | Rand | H04L 9/50 |
| 2024/0394705 A1* | 11/2024 | Abdelrahman | G06Q 20/389 |

OTHER PUBLICATIONS

Chainlink: "What Are Cross-Chain Smart Contracts?", May 24, 2023, pp. 1-13.

Kosinski J., "Ethereum Oracle Contracts: Setup and Orientation", Toptal, retrieved from https://www.toptal.com/ethereum/ethereum-oracle-contracts-tutorial-pt1 on Jul. 3, 2023, pp. 1-34.

Preethi Kasireddy, "The Architecture of a Web 3.0 application," hhttps://www.preethikasireddy.com/post/the-architecture-of-a-web-3-0-application, Sep. 22, 2021, 31 pages.

McBride, M., et al., "BGP Blockchain," Workgroup: Network Working Group, Internet-Draft: draft-mcbride-rtgwg-bgp-blockchain-02, https://datatracker.ietf.org/doc/draft-mcbride-rtgwg-bgp-blockchain/, Mar. 6, 2023, 13 pages.

Trossen, D., et al., Industry IoT Consortium, "Impact of Distributed Ledgers on Provider Networks," An Industry IoT Consortium Whitepaper, iiconsortium.org, Jan. 10, 2022, 20 pages.

Layer Zero, "Seamlessly Connected Blockchains," retrieved from https://layerzero.network, May 5, 2023, 4 pages.

Connext Labs, "Welcome to the Connext Docs," https://docs.connext.network/, May 5, 2023, 3 pages.

Cloudflare, "Your Gateway to Web3," Easy access to IPFS and Ethereum networks, retrieved from https://www.cloudflare.com/application-services/products/web3/ on Jul. 26, 2023, 9 pages.

Settlemint, "Blockchain Made Easy.," retrieved from https://www.settlemint.com/, on Jul. 26, 2023, 26 pages.

Tenderly, "Enabling Web3 developers to build, test, monitor, and operate smart contracts from their inception to mass adoption.," Ethereum Development Platform, retrieved from https://tenderly.co/, Jul. 26, 2023, 11 pages.

Kaleido, "Your Web3 Platform for Blockchain & Digital Assets," Enterprise-Grade Blockchain & Digital Asset Platform, retrieved from https://www.kaleido.io/, on Jul. 26, 2023, 9 pages.

Wang, Q., et al., "Exploring Web3 From the View of Blockchain," (Tech Report), https://www.researchgate.net/publication/361416088_Exploring_Web3_From_the_View_of_Blockchain, Jun. 17, 2022, 38 pages.

Metamask, "A crypto wallet & gateway to blockchain apps," retrieved from https://metamask.io/, on Jul. 26, 2023, 10 pages.

Middleware, "Web3 observability: How to monitor Web3 applications," https://middleware.io/blog/web3-observability/, Dec. 6, 2022, 22 pages.

\* cited by examiner

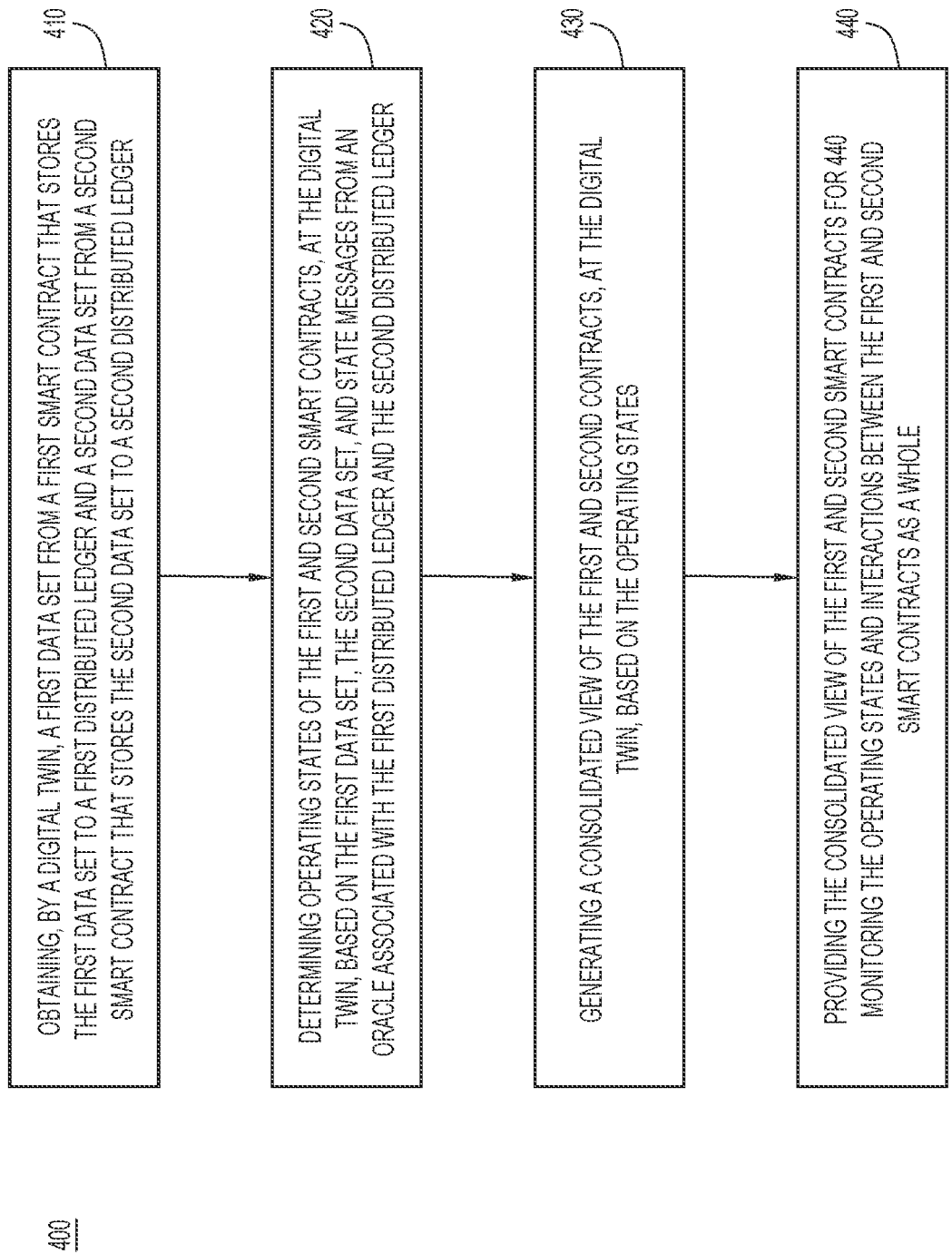

SYSTEMS AND METHODS FOR OBSERVING SMART CONTRACTS

TECHNICAL FIELD

The present disclosure relates to systems and methods for observing smart contracts.

BACKGROUND

Blockchain systems have been proposed for a variety of application scenarios, including applications in the financial industry, health care, Internet of Things (IoT), and so forth. With the development of new technologies, distributed ledger platforms and systems, such as blockchains, are useful for storing data in an immutable and attestable manner. For example, users of cryptocurrency can utilize a distributed ledger system to keep track of transactions by storing such transaction data across a network of disparate computing systems that are not under the central command of a single server and/or authority. Without a central command server and/or authority, the computing systems operating within the network can be considered trustless in the sense that the computing systems are acting independently. To ensure the consistency of the data across the distributed ledger system network, computing systems operating within the distributed ledger system network will utilize a shared consensus mechanism.

BRIEF DESCRIPTION OF THE DRAWINGS

FIG. 4 is a flow chart depicting a method for observing smart contracts, according to an example embodiment.

DESCRIPTION OF EXAMPLE EMBODIMENTS

Overview

Figure 1:
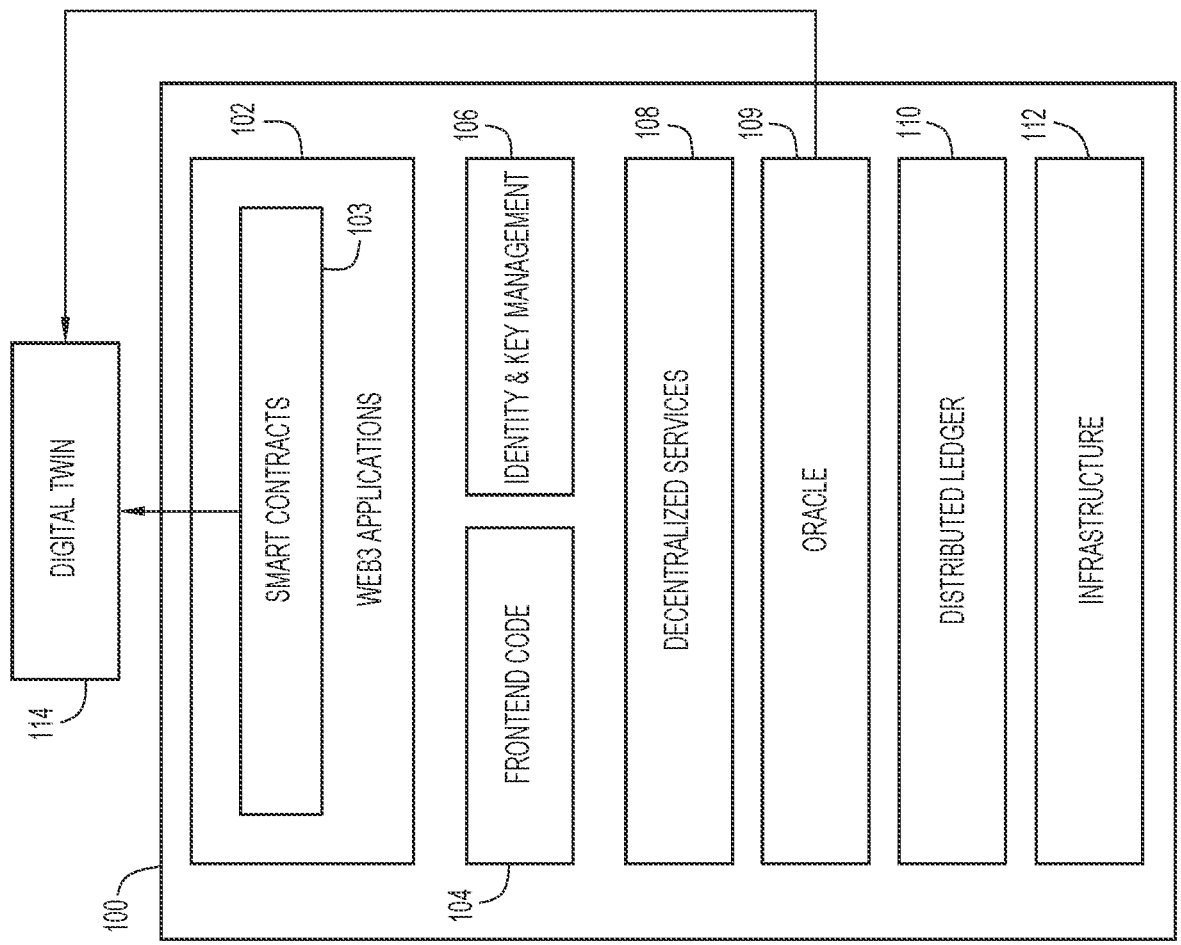
FIG. 1 is a block diagram of a Web3 model for utilizing, supporting, and/or providing Web3 services, according to an example embodiment.

Presented herein are techniques for observing smart contracts. According to one aspect a computer-implemented method involves obtaining, by a digital twin, a first data set from a first smart contract that stores the first data set to a first distributed ledger and a second data set from a second smart contract that stores the second data set to a second distributed ledger. The method further involves determining operating states of the first and second smart contracts based on the first data set, the second data set, and one or more state messages from an oracle associated with the first distributed ledger and the second distributed ledger. The method further involves generating a consolidated view of the first and second contracts based on the operating states. The method further involves providing the consolidated view of the first contract and the second contract for monitoring the operating states and interactions between the first and second smart contracts as a whole.

Example Embodiments

An entity may be associated with two or more smart contracts. Each of the smart contracts can involve the entity and can also involve parties that are separate from one another. For example, the entity can be a party to a first smart contract that may be between the entity and a first party while the second smart contract may be between the entity and a second party. The first party may not be authorized to view the second smart contract and the second party may not be authorized to view the first smart contract. However, the outcome of the first smart contract may affect the outcome of the second smart contract. Therefore, the technology presented herein provides solutions for the entity to view the first and second smart contracts as a whole in one location and also generates models based on the first and second smart contracts that can be used to analyze and make predictions regarding the outcomes of the first and second smart contracts.

Embodiments of the technology present herein can provide a digital twin that receives data regarding the first and second smart contracts from an oracle that is associated with both the first and second smart contracts. The digital twin can also receive data directly from the first and second smart contracts. In one example, the digital twin can be described as a data store that has capabilities beyond a standard data store. For example, the digital twin can store copies of smart contracts but can also generate a representation of a smart contract state i.e., current state. In one example, a digital twin mirrors current operating state of the smart contract. The digital twin can have the initial state of the smart contract. Update messages received from the deployed smart contract obtained by the digital twin are then used to update the representation or model of the smart contract within the digital twin. In one or more example embodiments, the digital twin is configured to mirror more than one smart contract.

Smart contracts can be described as computer programs that are intended to automatically execute, control, or document relevant events and actions according to the terms of a contract or an agreement. The contract can be expressed as 'code'-including if/then statements, functions, and other programming that automates the actions specified in a contract. A distributed ledger can support smart contract capabilities by enabling the smart contract's state machine to read from, and store state to, the distributed ledger. Smart contracts can be short-lived, performing a particular action and subsequently becoming redundant. They may also be long-lived, operating repeatedly in reaction to calls being made to the smart contract code.

A smart contract outcome may be composed of multiple component contracts operating in concert. Complexity can arise when the component contracts span ledgers and operate across different administrative domains. Further, different ledger protocols may be in use. Upgradeable smart contracts create a challenge since contract code may now change over time rather than being 'fixed'. As a result, smart contracts may change behavior over time either intentionally or unintentionally.

Issues can arise in respect to ongoing operational, security, and behavioral monitoring of such smart contracts and the data that the contracts operate over. For example, a contract may expect to be executed once a day, with transactions between known sets of addresses. Variations or exceptions from the norm may indicate a breach or exploit that the responsible authority needs to be alerted to. The challenge is being able to monitor and ensure correct operation when contracts span multiple entities. The techniques presented herein provide solutions for using a digital twin for observing multiple smart contracts as well as providing models based on the smart contracts that can be used to analyze and make predictions regarding the outcomes of the smart contracts.

Smart contracts can execute in a Web3 environment. The term "Web3" denotes a collection of technologies and network models that collectively provide a decentralized approach in contrast to the prevailing centralized model of systems and solutions. In a centralized model, services are provided at the discretion of a single administrative entity. Conversely, in a decentralized model, services are delivered through the collaborative efforts of various administrative entities without a singular point of ownership or control. The primary objective of Web3 is to facilitate the creation of services composed of logical infrastructure offered by diverse administrative entities.

In such an environment, a set of technologies is necessary to establish trust and assurance concerning the operation and execution of services. This entails fostering trust and assurance among administrative entities offering logical infrastructure, as well as ensuring trust and assurance for the users of the resulting services. This set of technologies may encompass distributed ledgers, consensus mechanisms, payment methods for service exchanges, decentralized protocols, and smart contracts. These technologies work in tandem to enable the development of applications and services.

In a Web3 paradigm, a smart contract can execute using distributed ledger technology (DLT). DLT may be an append-only distributed data structure that includes authenticity and integrity features in which updates (inserts) must be accepted via a consensus mechanism among validators. Validators may refer to blockchain contribution nodes that run a block consensus protocol. Blockchains refer to a type of DLT wherein the underlying data structure includes a hash chain of blocks of data. Contribution nodes are a component of a distributed ledger that provide compute, storage, and/or bandwidth services for running a DLT, blockchain, or other decentralized service. In DLT, contribution tokens may be a unit of value bound to the action of contributing to a peer-to-peer network running the DLT or blockchain; value tokens may store value and can be traded as assets. In the context of Web3, a smart contract may include a computer program that is configured to automatically execute, control, or document relevant events and actions according to the terms of a contract or agreement. A DLT may implement smart contracts by including a state machine that can be updated via DLT updates. A DLT may interface with one or more oracles, which are independent entities that provide information into and/or out of the ledger from an external source or sources. A distributed application (dApp) may run on a blockchain using a DLT to store state, and can utilized smart contract technology. Thus, a dApp is distributed in the sense that a dApp does not use a single central server as a service core.

Embodiments will now be described in detail with reference to the Figures. Reference is now made to FIG. 1. FIG. 1 is a block diagram of a Web3 model 100 utilizing, supporting, and/or providing Web3 services while also interacting with a digital twin 114, according to an example embodiment.

Web3 model 100 has various layers, including a Web3 application layer 102, smart contracts 103, a frontend code layer 104, an identity and key management layer 106, a decentralized services layer 108, an oracle 109, a distributed ledger layer 110, and an infrastructure layer 112. It should be appreciated that these layers are examples that are provided for the sake of clarity, and may not indicate any particular network topology. The Web3 model 100 can provide Web3 services some of which may interact with a digital twin 114 for providing a consolidated view of a first contract and a second contract of the smart contracts 103. The digital twin 114 monitors the operating states and interactions between the first and second smart contracts as a whole. The digital twin 114 can be described as leveraging the methods or technologies of the Web3 model 100.

Web3 application layer 102 may include one or more Web3 services that provide utility to end-users. These Web3 services may encompass a wide range of user experiences, use cases, and applications that leverage the benefits of decentralized technologies, and may not be limited to strictly Web3 environments. Some of the prominent use cases and applications may include smart contracts 103, single or multi-player games, virtual meeting environments, online collaboration tools, social media platforms, collectibles, augmented reality applications, virtual reality applications, cryptocurrency platforms, and the like. It is important to note that while these experiences and use cases can be facilitated by Web3 technologies, they are not exclusively dependent on Web3 and can be implemented in other contexts as well.

Frontend code layer 104 for Web3 applications may refer to the application code that runs on client devices, enabling the user interface and interaction with decentralized services. This code can use various languages, such as JavaScript®, Hypertext Markup Language (HTML), and/or Cascading Style Sheets (CSS). Frontend code layer 104 can provide the necessary functionality to interact with decentralized networks, access smart contracts, and handle user interactions. Frontend code layer 104 may include frameworks and libraries that can be utilized to build scalable and modular Web3 front-end applications (e.g., Web3 applications of Web3 application layer 102). In some embodiments, frontend code layer 104 provides the structure and content of Web pages, such as user interface elements, including text, buttons, forms, and containers. Frontend code layer 104 can be configured to provide any desired colors, fonts, layouts, and/or other visual properties of a user interface. Thus, frontend code layer 104 may enable the creation of dynamic and interactive user interfaces, facilitating the integration of decentralized functionality, and providing the particular user experience when interacting with Web3 services on client devices.

Identity and key management layer 106 provides an infrastructure for managing user identities, cryptographic keys, accounts, certificates, and signing operations within decentralized applications. Identity and key management layer 106 may ensure secure and reliable authentication, authorization, and cryptographic operations. In some embodiments, identity and key management layer 106 manages wallets, which are software applications that enable users to securely store and manage their cryptographic keys. These wallets typically employ strong encryption techniques to safeguard private keys and provide convenient interfaces for users to interact with their accounts and assets on decentralized networks. Identity and key management layer 106 may manage cryptographic keys, which are used for various purposes, including identity verification, digital signatures, encryption, and/or access control. Web3 identity systems often utilize public-key cryptography, where users possess a private key for signing transactions or providing proof of identity, and a corresponding public key for verification purposes. In some embodiments, identity and key management layer 106 manages Web3 accounts that are associated with specific identities or entities on decentralized networks. The accounts can be linked to cryptographic key pairs and may serve as the primary mechanism of interaction and ownership within the Web3 ecosystem. Accounts enable users to access and manage their assets, interact with smart contracts, and participate in network activities. Identity and key management layer 106 may manage certificates for enhancing trust and security. Certificates can serve as digital credentials that bind a user's identity to their cryptographic keys, enabling verification and validation of identities in decentralized environments. Certificates can be issued by trusted authorities or implemented through decentralized identity frameworks. In some embodiments, identity and key management layer 106 performs signing operations, which may involve using cryptographic keys to generate digital signatures. In Web3 environments, signing is used to ensure data integrity, non-repudiation, and/or secure transactions. By signing messages or transactions with their private keys, users can prove ownership and provide cryptographic proof of authenticity and integrity. Decentralized services layer 108 includes multiple disparate entities collaborating to offer various services. These services may include distributed document storage, tokenization, proof-of-existence, distributed computation-as-a-service, distributed communications-as-a-service, distributed ledger indexing and querying, and/or payment and exchange of value. Distributed document storage enables decentralized storage of files across a network of nodes, ensuring data availability and resilience. Tokenization represents real-world assets or rights as digital tokens, enabling fractional ownership and transferability. Proof-of-existence allows users to prove the integrity and timestamped existence of digital assets. Distributed computation-as-a-service may employ collective computational power for complex tasks, whereas distributed communications-as-a-service may facilitate secure and private communication without centralized intermediaries. Distributed ledger indexing and querying can provide access to data on distributed ledgers. Payment and exchange systems enable decentralized transactions using blockchain technology.

Oracle 109 can be a computer program that is able to access data from outside of the world or network of the blockchain. In one form, the oracle 109 provides for accessing data from a world outside a blockchain by smart contracts 103 that interact with the oracle 109. The oracle 109 may obtain data from an outside world (external to smart contracts 103) and put it or write it into a blockchain for other smart contracts to consume. The oracle 109 may be capable of receiving data from a distributed ledger regarding a state of a smart contract. The oracle 109 can send data, such as messages regarding the state of the smart contract, to locations outside of the world or network of the block chain. Sending messages outside of the world or network of the blockchain can be described as out-of-band communications. The out-of-band communications can be using networks and network protocols other than those used between a smart contract and a distributed ledger. The out-of-band communications can be over the internet, a data network, a cellular network, or a local access network. The oracle 109 may be capable of receiving data from and interacting with more than one smart contract. The digital twin 114 can obtain out-of-band communications from the smart contracts 103 and the oracle 109.

Distributed ledger layer 110 may employ one or more distributed ledgers that include various components and mechanisms to establish trust and assurance between entities in a decentralized environment. Distributed ledger layer 110 may include distributed ledger technologies, consensus mechanisms, layer 1 and layer 2 ledgers, rollups, zero-knowledge proofs, sharding, smart contract code, smart contract execution engines, contribution nodes, validator nodes, peer-to-peer (P2P) communications protocols, contribution tokens, and oracles. Distributed ledger technologies enable the decentralized storage and management of data across a network of nodes, and consensus mechanisms ensure agreement on the state of the ledger among participating nodes. Layer 1 features utilize methods such as changing the consensus mechanism, forking the chain, and sharding. In contrast, layer 2 services include state channels, nested blockchains, rollups, and sidechains. Rollups may aggregate and process transactions off-chain before committing the transactions to the main chain. Zero-knowledge proofs enable privacy-preserving and verifiable computations. Sharding elements partition the network into smaller groups, enhancing scalability. Smart contract code represents self-executing agreements on the ledger, while smart contract execution engines handle the processing and validation of these contracts. Distributed ledger layer 110 may include contribution nodes and validator nodes that maintain and secure the network. In some embodiments, peer to peer (P2P) communications protocols facilitate decentralized communication between nodes. Distributed ledger layer 110 utilizes contribution tokens to incentivize participation and contribution within the network. In some embodiments, distributed ledger layer 110 includes one or more oracles to provide external data and real-world information to smart contracts or other distributed applications.

Infrastructure layer 112 may include a set of components that form the hardware and/or software that supports decentralized services and models, which may be substantially similar to those found in centralized systems. Infrastructure layer 112 can include compute resources, network infrastructure, telecommunications capabilities, bandwidth availability, processing capacity, hosting services, access mechanisms, security measures, and software frameworks. Compute resources may include the hardware and software required for data processing and storage such as processor(s), microprocessor(s) and memory. Network infrastructure enables the connectivity and communication between nodes in the decentralized network, and other telecommunication elements may be responsible for the exchange of data and information across different network endpoints. Hosting services can support the deployment and management of decentralized applications and services. Access mechanisms may be provided to enable users to interact with the decentralized infrastructure of various components of Web3 model 100 and its various services. Security measures may be provided to protect data, privacy, and network integrity. Software frameworks may provide the tools and libraries for developing and running Web3 applications in Web3 application layer 102.

Figure 2:
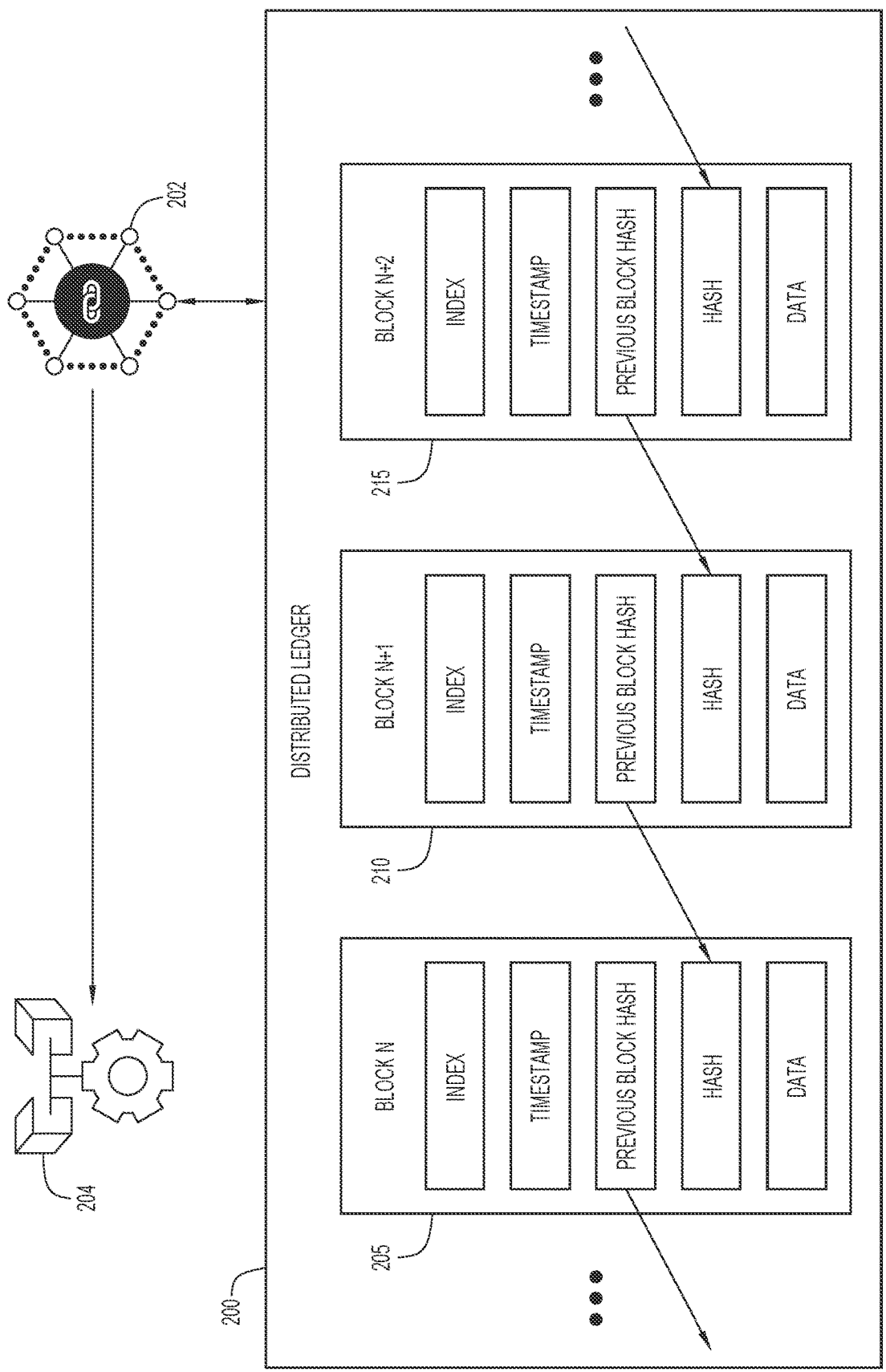
FIG. 2 is a block diagram depicting a distributed ledger for performing or supporting various operations in accordance with an embodiment of the present invention.

With reference now to FIG. 2, a block diagram is provided depicting a distributed ledger 200 for performing or supporting various operations in accordance with an example embodiment. The distributed ledger 200 can be associated with a smart contract 202 that can write data or information to the distributed ledger 200 in blocks. As depicted, there are three blocks, block N (205), block N+1 (210), and block N+2 (215). It should be appreciated that this depiction of a distributed ledger 200 is only a portion of the ledger, and information can be stored as an entry in any block in distributed ledger 200. In some embodiments, distributed ledger 200 is a blockchain. Distributed ledger 200 may correspond to elements that are depicted and described with reference to distributed ledger layer 110 of FIG. 1. Data that is sent from the smart contract 202 to the distributed ledger 200 can also be obtained by a digital twin 204 from the smart contract 202. The digital twin 204 can mirror the smart contract 202 as other smart contracts and can provide observability into multiple smart contracts at one location to allow for monitoring of the interactions and state changes to the smart contracts.

Each block 205-215 may include an index, a timestamp, a previous block hash, a hash, and data. The index of a block includes an identifier for the block, such as a unique key. The timestamp of a block may indicate when the block was created, validated, and/or last modified. The previous block hash contains a hash of information in the previous block, which in turn capture, via their own hash, information in the next preceding block, ensuring that data recorded in distributed ledger 200 is immutable. In some embodiments, each hash may be a cryptographic hash, and may include a hash of the data stored in its block as well as the data corresponding to the previous block's hash. Thus, once recorded, the data in any given block cannot be altered retroactively without alteration of all subsequent blocks, which requires consensus of the network majority. The data can include any desired data, such as a transaction record, video data, text data, audio data, time-series data, encrypted data, data and corresponding metadata, and the like.

Figure 3A:
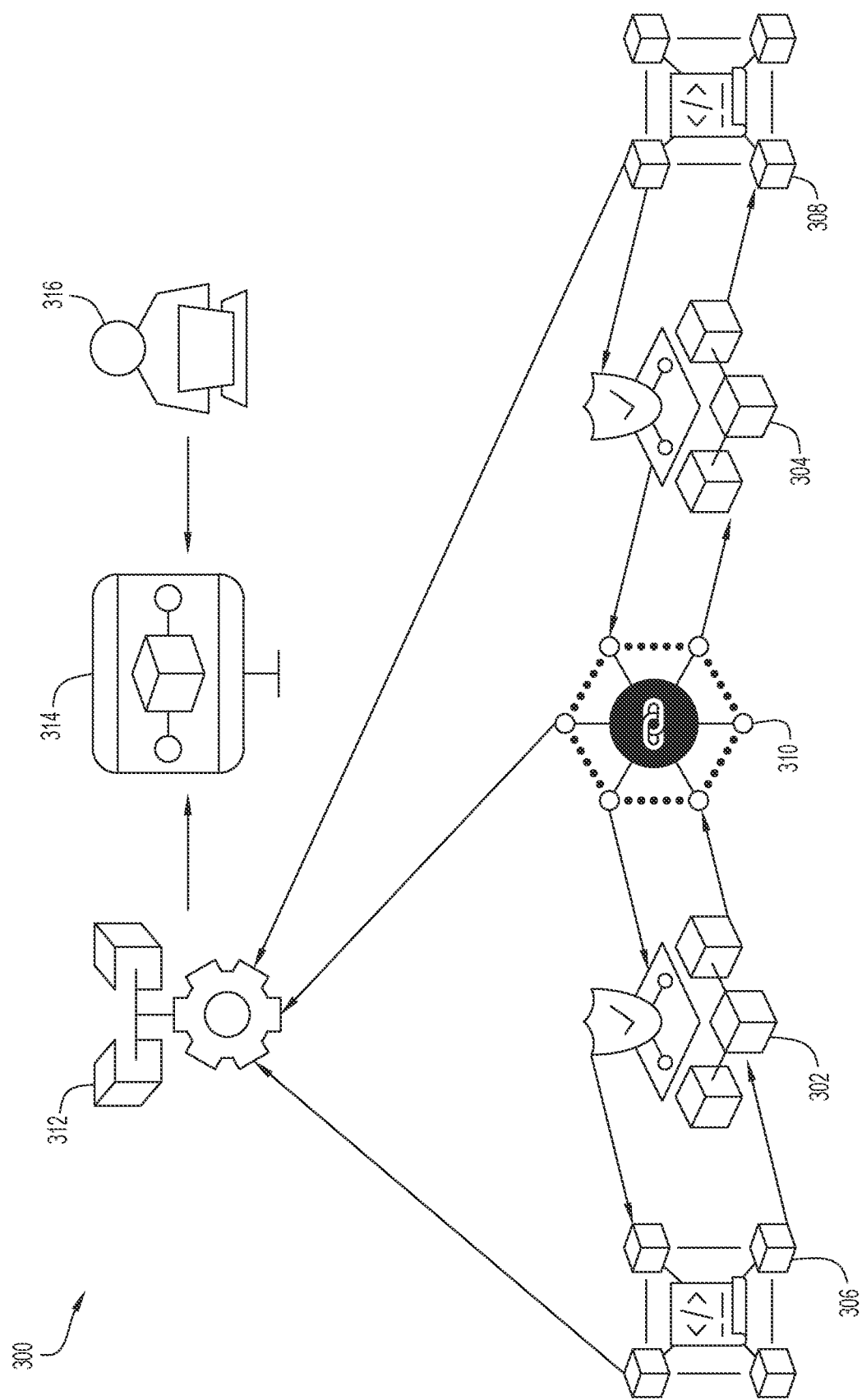
FIG. 3A is a block diagram of a system for observing smart contracts, according to an example embodiment.

FIG. 3A shows a system 300 that includes distributed ledgers 302 and 304, according to an example embodiment. The system 300 further includes smart contracts 306 and 308, an oracle 310, a digital twin 312, a simulation 314, and a client 316.

The distributed ledgers 302 and 304 can have the same features and capabilities as the distributed ledger layer 110 of FIG. 1. The distributed ledgers 302 and 304 can be different from one another and may not be capable of communicating with or accessing data from one another. This can also be described as a lack of visibility into one another. This lack of visibility can be intentional due to the nature of smart contracts and distributed ledgers. The distributed ledger 302 may be associated with a smart contract 306 and the distributed ledger 304 may be associated with a smart contract 308. Each of the distributed ledgers 302 and 304 can send data regarding the smart contracts 306 and 308, respectively, to an oracle 310.

The distributed ledgers 302 and 304 may not be capable of communicating with components, modules, computer programs, and/or devices outside of the environment associated with the distributed ledgers. For example, the distributed ledgers 302 and 304 may be capable of only communicating with smart contracts 306 and 308, respectively, and to the oracle 310 and may not be capable of communicating with a digital twin 312. The oracle 310 can be independent and interface with the distributed ledgers 302 and 304 to provide information into and/or out of the smart contracts 306 and 306. The oracle 310 can be a computer program that is able to access data from outside of the world or network of the blockchain. The oracle 310 can send data, such as messages regarding the state of the smart contracts 306 and 308, to locations outside of the world or network of the block chain such as the digital twin 312. Sending messages outside of the world or network of the blockchain can be described as out-of-band communications. The out-of-band communications can be using networks and network protocols other than those used between a smart contract and a distributed ledger. The out-of-band communications can be over the internet, a data network, a cellular network, or a local access network. The oracle 310 may be capable of receiving data from and interacting with more than two smart contracts.

In one example, the smart contract 306 is not capable of directly interacting with the distributed ledger 304 that is remote to the smart contract 306. The oracle 310 can interface with both distributed ledgers 302 and 304 and an address. Information or data 'written' to the address of the oracle 310 address on distributed ledger 302 can be transferred across to the distributed ledger 304. Once on the distributed ledger 304, the information or data can then be read and actioned upon by the smart contract 308.

Even with the oracle 310, there may not be observability into both the smart contracts 306 and 308 from the same location or from the same view. In one embodiment, the smart contract 306 and 308 are cross-chain smart contracts. While existing solutions seek to enable cross-chain communication, previous solutions do not look to provide observability or insight into the state of the smart contracts. Cross-chain smart contracts create particular challenges, since two or more smart contracts, potentially working independently, interact. From a management perspective, to provide visibility, a solution may be able to observe the state of all of the smart contracts that interact in order to have confidence in the overall operation. One of the difficulties is that no centralized point of control for a cross-chain smart contract. The techniques presented herein allow for a consolidated view from one location that provides observability into both the smart contracts 306 and 308. In one example, when each of the smart contracts 306 and 308 are initiated, a copy of the code for the smart contracts is obtained by the digital twin 312. This can be described as the digital twin 312 obtaining a first data set from the smart contract 306 and a second data set from the smart contract 308. During the execution or operation of a smart contract, such as the smart contracts 306 and 308, the smart contract code may have existing capabilities to emit messages in response to events occurring. Such messages can be used to update the state of a smart contract. For example, Ethereum Virtual Machine (EVM) can be used for code for a smart contract and has the ability to emit such state messages.

In one example, to provide observability, the smart contracts 306 and 308 each send the emit messages to the digital twin 312 and can be used by the digital twin 312 to update the copy of or the initial state of the smart contracts held in a data store of the digital twin 312. The emit messages can be sent by the smart contracts 306 and 308 to the digital twin 312 via an out-of-band communications method or technique. The out-of-band communications between the smart contracts 306 and 308 and the digital twin 312 can be employed to ensure the communications take place and take place securely.

During execution or operation of the smart contracts 306 and 308, messages can also be emitted by the oracle 310 via the out-of-band communications mechanism towards the digital twin 312. When a transaction is received by the oracle 310 from the smart contracts 306 or 308, a state message can be sent by the oracle 310 to the digital twin 312. The state message can be used by the digital twin 312 to confirm that the emit message received at the digital twin 312 directly from the smart contracts 306 or 308 was also passed from the smart contract to the distributed ledger 302 or 304, respectively. Such as message may only be emitted once confirmation to chain has taken place (when consensus is reached). When a state change occurs on smart contract 308, again a message can be emitted towards the digital twin 312 via an out-of-band communications mechanism. When operating in the other direction, with information being passed from distributed ledger 304 to 302, the oracle 310 can again emit messages to the digital twin 312 once consensus has been reached. The out-of-band communications can be sent over the internet, a data network, a cellular network, a local access network, a radio network, or another type of communication that is sent using a different communication technique, method, or protocol than what is used for communications between the smart contract and the distributed ledger. In one example, the communications between the smart contract and the distributed ledger can be described as local communications while the out-of-band communications are not local communications.

In addition to providing observations of state of a smart contract, the present technology may also be capable of modeling potential interactions of two or more smart contracts through a simulation 314. The simulation 314 can be informed by real-world state information regarding the smart contracts 306 and 308 that is provided by the digital twin 312. A client 316 may then be able to understand current state of the smart contracts 306 and 308 and explore potential future states of the smart contracts 306 and 308.

Figure 3B:
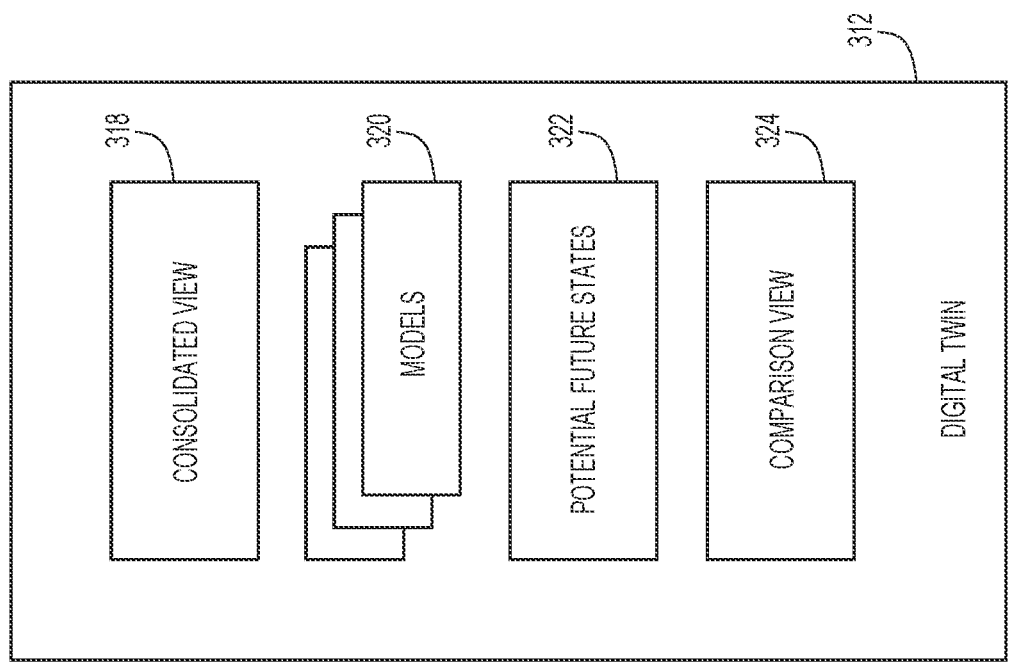
FIG. 3B is a block diagram of a digital twin for observing smart contracts, according to an example embodiment.

FIG. 3B is a block diagram showing the digital twin 312 of FIG. 3A, according to an example embodiment. The digital twin 312 generates a consolidated view 318, models 320, potential future states 322, and comparison view 324.

The digital twin 312 can provide the consolidated view 318 of the smart contracts 306 and 308 based on the messages sent to the digital twin 312 by the smart contracts 306 and 308 and the oracle 310. The consolidated view 318 can be in one location and allows an entity to view or observe both the smart contracts 306 and 308 at the same time. For example, the entity may be party to the smart contract 306 with a second party and is also party to the smart contract 308 with a third party. Because the second party and the third party are not party to the same contract, the smart contracts 306 and 308 may not have visibility into one another. However, observability into both of the smart contracts 306 and 308 at the same time in the same location can be useful to the entity that is party to both of the smart contracts 306 and 308. For example, the smart contract 306 may be a contract for the second party to produce and sell a widget to the entity while the smart contract 308 is for the entity to provide a gizmo to the third party where the widget is a component of the gizmo. Therefore, production of the gizmos is dependent upon the entity obtaining the widgets. A delay in production of the widgets according to the terms of the smart contract 306 can cause a delay in the fulfillment of the smart contract 308. Therefore, the entity having observability into both the smart contracts 306 and 308 can be useful.

In one embodiment, the simulation 314 of FIG. 3A is part of the digital twin 312. The client 316 can be a computer system that is associated with a user or operator that has the authorization to access information related to the smart contracts 306 and 308. The digital twin 312 and the simulation 314 can provide the client 316 with monitoring of the operating states of the smart contracts 306 and 308 as well as information about the interactions between the smart contracts 306 and 308.

In one example, the digital twin 312 can serve to a) model an individual smart contract state and b) provide a set of models of two or more smart contracts that interact. By being able to model a) individual contracts and b) the set of contracts as a whole, the present technology affords the possibility to compare a current state of a smart contract to a previous state of the same smart contract in a comparison view 324 of the states of the smart contract. The comparison view 324 can be useful when attempting to understand if the component contracts are operating as expected and therefore if the outcome of a smart contract is likely to be operating as expected. For example, the comparison view 324 can be useful for comparing two smart contracts as whole when the outcome of one smart contract depends upon another smart contract. In one example, the outcome of the smart contract 306 can depend on the outcome of the smart contract 308. There may be an expectation as to how the smart contract 308 is to be executed such as a completion date or benchmark dates that should be met for the smart contract 308 to execute as expected. Therefore, if the smart contract is not executing as expected, then the smart contract 306 may not be able to execute as expected because the smart contract 306 depends on the outcome of the smart contract 308. In such an example, the comparison view 324 can compare the interactions of the smart contracts 306 and 308 to determine if the smart contract 308 is executing as expected and if not, then adjustments may be made to expectations regarding the smart contract 306. The comparison view 324 can compare a current state to a past state of the smart contract 308 to determine if the smart contract 308 is executing as expected. It should be appreciated that the consolidated view 318, a model or the models 320, the potential future states 322, or the comparison view 324 can be hosted by the digital twin 312 or by the simulation 314. The simulation 314 can be hosted on a different computer system than the digital twin 312 and the client 316.

In one example, the consolidated view 318, the potential future states 322, or the comparison view 324 can cause a change to be brought about to either of the smart contracts 306 and 308. For example, the potential future states 322 may predict that a completion date for the smart contract 306 is going to be delayed relative to the terms set for completion of the smart contract 306. Such as prediction may then cause the completion date of the smart contract 308 to be changed to a later date to match the delay predicted regarding the smart contract 306. Such a change can be automated and implemented automatically by a computer system or can be implemented by a user associated with the client 316.

FIG. 4 illustrates a flow chart for a computer-implemented method 400 for observing smart contracts, according to an example embodiment. This method 400 is applicable to operation of any of the devices, cloud computes, mechanisms, and engines presented herein. The method 400 includes, at step 410, obtaining, by a digital twin, a first data set from a first smart contract that stores the first data set to a first distributed ledger and a second data set from a second smart contract that stores the second data set to a second distributed ledger. The method 400 further includes, at step 420, determining operating states of the first and second smart contracts based on the first data set, the second data set, and one or more state messages from an oracle associated with the first distributed ledger and the second distributed ledger. The method 400 further includes, at step 430, generating a consolidated view of the first and second contracts based on the operating states. The method 400 further includes, at step 440, providing the consolidated view of the first and second contracts for monitoring the operating states and interactions between the first and second smart contracts as a whole.

Observing Smart Contracts Aspects

In some aspects, the techniques described herein relate to a computer-implemented method for observing smart contracts, including: obtaining, by a digital twin, a first data set from a first smart contract that stores the first data set to a first distributed ledger and a second data set from a second smart contract that stores the second data set to a second distributed ledger; determining operating states of the first and second smart contracts based on the first data set, the second data set, and one or more state messages from an oracle associated with the first distributed ledger and the second distributed ledger; generating a consolidated view of the first and second smart contracts, based on the operating states; and providing the consolidated view of the first and second smart contracts for monitoring the operating states and interactions between the first and second smart contracts as a whole.

In some aspects, the techniques described herein relate to a method, further including: generating, by the digital twin, a model or a set of models that includes a current state of the first smart contract and/or of the second smart contract, wherein the model or the set of models are based on the consolidated view.

In some aspects, the techniques described herein relate to a method, further including: determining potential future states of the first and second smart contracts using the model or the set of models to predict potential interactions between the first and second smart contracts.

In some aspects, the techniques described herein relate to a method, further including: comparing a current state of the first smart contract to a previous state of the first smart contract based on the model or the set of models generated by the digital twin to generate a comparison view of states of the first smart contract; and determining if the first smart contract is operating as expected based on the comparison view.

In some aspects, the techniques described herein relate to a method, further including: obtaining updates to a state of the first and second smart contracts after the consolidated view has been provided, wherein the updates are from the oracle, the first smart contract, or the second smart contract; and updating the model or the set of models based on the updates to the first and second smart contracts.

In some aspects, the techniques described herein relate to a method, wherein the first and second smart contracts are cross-chain smart contracts.

In some aspects, the techniques described herein relate to a method, wherein obtaining the first and second data set includes: obtaining the first and second data set via an out-of-band communication, wherein the out-of-band communication involves one or more of a data network, a cellular network, or a local access network.

In some aspects, the techniques described herein relate to a method, further including: obtaining, by the digital twin from the oracle, the state messages, via an out-of-band communication channel, wherein the out-of-band communication channel includes one or more of a data network, a cellular network, or a local access network.

In some aspects, the techniques described herein relate to a method, wherein the first smart contract and first distributed ledger do not have visibility into the second smart contract and the second distributed ledger, and the second smart contract and the second distributed ledger do not have visibility into the first smart contract and first distributed ledger.

In some aspects, the techniques described herein relate to one or more non-transitory computer readable storage media encoded with software including computer executable instructions that, when executed by a processor, cause the processor to perform a method for observing smart contracts, including: obtaining, by a digital twin, a first data set from a first smart contract that stores the first data set to a first distributed ledger and a second data set from a second smart contract that stores the second data set to a second distributed ledger; determining operating states of the first and second smart contracts based on the first data set, the second data set, and one or more state messages from an oracle associated with the first distributed ledger and the second distributed ledger; generating a consolidated view of the first and second smart contracts, based on the operating states; and providing the consolidated view of the first and second smart contracts for monitoring the operating states and interactions between the first and second smart contracts as a whole.

In some aspects, the techniques described herein relate to a non-transitory computer readable storage media, further including: generating, by the digital twin, a model or a set of models that includes a current state of the first smart contract and/or of the second smart contract, wherein the model or the set of models are based on the consolidated view.

In some aspects, the techniques described herein relate to a non-transitory computer readable storage media, further including: determining potential future states of the first and second smart contracts using the model or the set of models to predict potential interactions between the first and second smart contracts.

In some aspects, the techniques described herein relate to a non-transitory computer readable storage media, further including: comparing a current state of the first smart contract to a previous state of the first smart contract based on the model or the set of models generated by the digital twin to generate a comparison view of states of the first smart contract; and determining if the first smart contract is operating as expected based on the comparison view.

In some aspects, the techniques described herein relate to a non-transitory computer readable storage media, further including: obtaining updates to a state of the first and second smart contracts after the consolidated view has been provided, wherein the updates are from the oracle, the first smart contract, or the second smart contract; and updating the model or the set of models based on the updates to the first and second smart contracts.

In some aspects, the techniques described herein relate to a non-transitory computer readable storage media, wherein obtaining the first and second data set includes: obtaining the first and second data set via an out-of-band communication, wherein the out-of-band communication involves one or more of a data network, a cellular network, or a local access network.

In some aspects, the techniques described herein relate to a non-transitory computer readable storage media, further including: obtaining, by the digital twin from the oracle, the state messages, via an out-of-band communication channel, wherein the out-of-band communication channel includes one or more of a data network, a cellular network, or a local access network.

In some aspects, the techniques described herein relate to an apparatus for observing smart contracts, including: a memory; a network interface configured to enable network communications; and a processor, wherein the processor is configured to perform a method including: obtaining, by a digital twin, a first data set from a first smart contract that stores the first data set to a first distributed ledger and a second data set from a second smart contract that stores the second data set to a second distributed ledger; determining operating states of the first and second smart contracts based on the first data set, the second data set, and one or more state messages from an oracle associated with the first distributed ledger and the second distributed ledger; generating a consolidated view of the first and second smart contracts, based on the operating states; and providing the consolidated view of the first and second smart contracts for monitoring the operating states and interactions between the first and second smart contracts as a whole.

In some aspects, the techniques described herein relate to an apparatus, wherein the processor is further configured to perform: generating a model or a set of models that includes a current state of the first smart contract and/or of the second smart contract, wherein the model or the set of models are based on the consolidated view.

In some aspects, the techniques described herein relate to an apparatus, wherein the processor is further configured to perform: predicting potential future states of the first and second smart contracts using the model or the set of models to predict potential interactions between the first and second smart contracts.

In some aspects, the techniques described herein relate to an apparatus, wherein the processor is further configured to perform: comparing a current state of the first contract to a previous state of the first contract based on the model or the set of models generated by the digital twin to generate a comparison view of states of the first smart contract; and determining if the first smart contract is operating as expected based on the comparison view.

Figure 5:
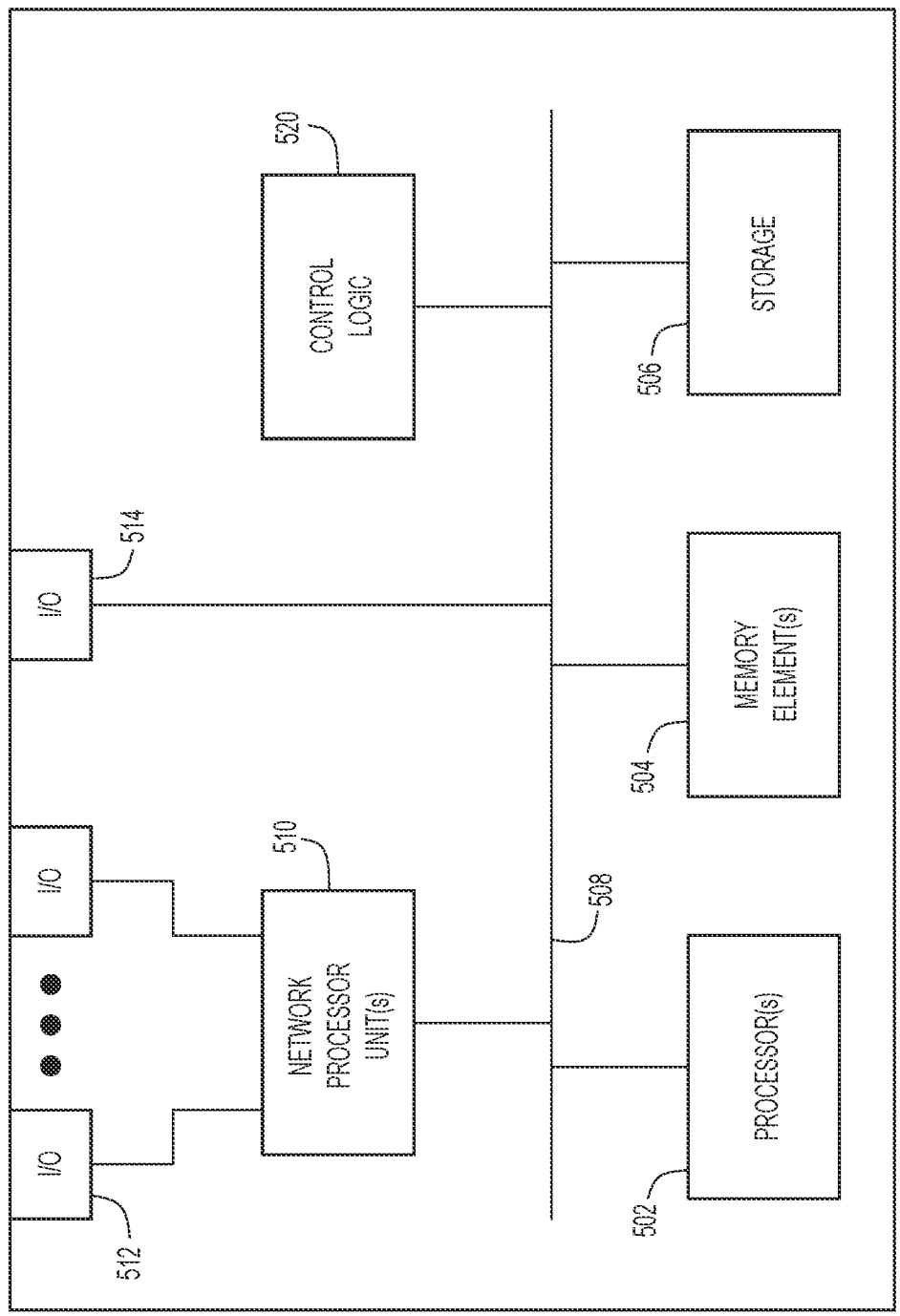
FIG. 5 is a block diagram of a computing or networking apparatus, according to an example embodiment.

FIG. 5 illustrates a hardware block diagram of a device 500 that may perform functions associated with operations discussed herein in connection with the techniques depicted in FIGS. 1-3A and 3B. For example, the device 500 can be the infrastructure layer 112 of FIG. 1 as well as the components of the system 300 of FIG. 3A.

In at least one embodiment, the device 500 may be any apparatus that may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for device 500 can overlap in any manner and are not limited to the specific allocation of instructions and/or operations described herein.

In at least one embodiment, processor(s) 502 is/are at least one hardware processor configured to execute various tasks, operations and/or functions for device 500 as described herein according to software and/or instructions configured for device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between device 500 and other systems, entities, etc., via network I/O interface(s) 512 (wired and/or wireless) to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 500 and other systems, entities, etc. to facilitate operations for various embodiments described herein. In various embodiments, network I/O interface(s) 512 can be configured as one or more Ethernet port(s), Fibre Channel ports, any other I/O port(s), and/or antenna(s)/antenna array(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to device 500. For example, I/O interface(s) 514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In another example embodiment, one or more non-transitory computer readable storage media encoded with instructions are provided. When the media is executed by a processor, the instructions cause the processor to execute a method that includes obtaining, by a digital twin, a first data set from a first smart contract that stores the first data to a first distributed ledger and a second data set from a second smart contract that stores the second data set to a second distributed ledger. The method further includes determining operating states of the first and second smart contracts based on the first data set, the second data set, and one or more state messages from an oracle associated with the first distributed ledger and the second distributed ledger. The method further includes generating a consolidated view of the first and second smart contracts, based on the operating states. The method further includes providing the consolidated view of the first and second smart contracts for monitoring the operating states and interactions between the first and second smart contracts as a whole.

In yet another example embodiment, an apparatus is provided. The apparatus includes a memory, a network interface configured to enable network communications, and a processor. The processor is configured to perform a method including obtaining, by a digital twin, a first data set from a first smart contract that stores the first data to a first distributed ledger and a second data set from a second smart contract that stores the second data set to a second distributed ledger. The method further includes determining operating states of the first and second smart contracts based on the first data set, the second data set, and one or more state messages from an oracle associated with the first distributed ledger and the second distributed ledger. The method further includes generating a consolidated view of the first and second smart contracts, based on the operating states. The method further includes providing the consolidated view of the first and second smart contracts for monitoring the operating states and interactions between the first and second smart contracts as a whole.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages'. 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein, and in the claims, can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the' (s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method for observing smart contracts, comprising:
    obtaining, by a digital twin, a first data set from a first smart contract that stores the first data set to a first distributed ledger and a second data set from a second smart contract that stores the second data set to a second distributed ledger;
    determining operating states of the first and second smart contracts based on the first data set, the second data set, and one or more state messages from an oracle associated with the first distributed ledger and the second distributed ledger;

generating a consolidated view of the first and second smart contracts, based on the operating states; and providing the consolidated view of the first and second smart contracts for monitoring the operating states and interactions between the first and second smart contracts as a whole.

2. The method of claim 1, further comprising:

generating, by the digital twin, a model or a set of models that includes a current state of the first smart contract and/or of the second smart contract, wherein the model or the set of models are based on the consolidated view.

3. The method of claim 2, further comprising:

determining potential future states of the first and second smart contracts using the model or the set of models to predict potential interactions between the first and second smart contracts.

4. The method of claim 2, further comprising:

comparing a current state of the first smart contract to a previous state of the first smart contract based on the model or the set of models generated by the digital twin to generate a comparison view of states of the first smart contract; and determining if the first smart contract is operating as expected based on the comparison view.

5. The method of claim 2, further comprising:

obtaining updates to a state of the first and second smart contracts after the consolidated view has been provided, wherein the updates are from the oracle, the first smart contract, or the second smart contract; and updating the model or the set of models based on the updates to the first and second smart contracts.

6. The method of claim 1, wherein the first and second smart contracts are cross-chain smart contracts.

7. The method of claim 1, wherein obtaining the first data set and the second data set includes:

obtaining the first data set and the second data set via an out-of-band communication, wherein the out-of-band communication involves one or more of a data network, a cellular network, or a local access network.

8. The method of claim 1, further comprising:

obtaining, by the digital twin from the oracle, the one or more state messages, via an out-of-band communication channel, wherein the out-of-band communication channel includes one or more of a data network, a cellular network, or a local access network.

9. The method of claim 1, wherein the first smart contract and first distributed ledger do not have visibility into the second smart contract and the second distributed ledger, and the second smart contract and the second distributed ledger do not have visibility into the first smart contract and first distributed ledger.

10. One or more non-transitory computer readable storage media encoded with software comprising computer executable instructions that, when executed by a processor, cause the processor to perform a method for observing smart contracts, comprising:

obtaining, by a digital twin, a first data set from a first smart contract that stores the first data set to a first distributed ledger and a second data set from a second smart contract that stores the second data set to a second distributed ledger;

determining operating states of the first and second smart contracts based on the first data set, the second data set, and one or more state messages from an oracle associated with the first distributed ledger and the second distributed ledger;

generating a consolidated view of the first and second smart contracts, based on the operating states; and providing the consolidated view of the first and second smart contracts for monitoring the operating states and interactions between the first and second smart contracts as a whole.

11. The non-transitory computer readable storage media of claim 10, further comprising:

generating, by the digital twin, a model or a set of models that includes a current state of the first smart contract and/or of the second smart contract, wherein the model or the set of models are based on the consolidated view.

12. The non-transitory computer readable storage media of claim 11, further comprising:

determining potential future states of the first and second smart contracts using the model or the set of models to predict potential interactions between the first and second smart contracts.

13. The non-transitory computer readable storage media of claim 11, further comprising:

comparing a current state of the first smart contract to a previous state of the first smart contract based on the model or the set of models generated by the digital twin to generate a comparison view of states of the first smart contract; and determining if the first smart contract is operating as expected based on the comparison view.

14. The non-transitory computer readable storage media of claim 11, further comprising:

obtaining updates to a state of the first and second smart contracts after the consolidated view has been provided, wherein the updates are from the oracle, the first smart contract, or the second smart contract; and updating the model or the set of models based on the updates to the first and second smart contracts.

15. The non-transitory computer readable storage media of claim 10, wherein obtaining the first data set and the second data set includes:

obtaining the first data set and the second data set via an out-of-band communication, wherein the out-of-band communication involves one or more of a data network, a cellular network, or a local access network.

16. The non-transitory computer readable storage media of claim 10, further comprising:

obtaining, by the digital twin from the oracle, the one or more state messages, via an out-of-band communication channel, wherein the out-of-band communication channel includes one or more of a data network, a cellular network, or a local access network.

17. An apparatus for observing smart contracts, comprising:

a memory;

a network interface configured to enable network communications; and a processor, wherein the processor is configured to perform a method comprising:

obtaining, by a digital twin, a first data set from a first smart contract that stores the first data set to a first distributed ledger and a second data set from a second smart contract that stores the second data set to a second distributed ledger;

determining operating states of the first and second smart contracts based on the first data set, the second data set, and one or more state messages from an oracle associated with the first distributed ledger and the second distributed ledger;

generating a consolidated view of the first and second smart contracts, based on the operating states; and providing the consolidated view of the first and second smart contracts for monitoring the operating states and interactions between the first and second smart contracts as a whole.

18. The apparatus of claim 17, wherein the processor is further configured to perform:

generating a model or a set of models that includes a current state of the first smart contract and/or of the second smart contract, wherein the model or the set of models are based on the consolidated view.

19. The apparatus of claim 18, wherein the processor is further configured to perform:

predicting potential future states of the first and second smart contracts using the model or the set of models to predict potential interactions between the first and second smart contracts.

20. The apparatus of claim 18, wherein the processor is further configured to perform:

comparing a current state of the first smart contract to a previous state of the first smart contract based on the model or the set of models generated by the digital twin to generate a comparison view of states of the first smart contract; and determining if the first smart contract is operating as expected based on the comparison view.

* * * * *